United States Patent [19]

Fisher

[11] 4,204,746
[45] May 27, 1980

[54] REFLECTIVE SIGNALLING DEVICE

[76] Inventor: Clyde E. Fisher, P.O. Box 207, Owosso, Mich. 48867

[21] Appl. No.: 840,135

[22] Filed: Oct. 7, 1977

[51] Int. Cl.² .............................................. G02B 5/12
[52] U.S. Cl. ........................................ 350/99; 350/97
[58] Field of Search ................ 350/99, 105, 266, 285, 350/286, 62, 289, 61; 46/58; 280/200, 180; 301/37 SA, 37 SR; D34/5 L, 15 F, 15 W; 351/25

[56] References Cited
U.S. PATENT DOCUMENTS

| | | | |
|---|---|---|---|
| 3,064,536 | 11/1962 | Weingartner | 350/289 |
| 3,374,763 | 3/1968 | Browning | 350/99 |
| 3,435,213 | 3/1969 | Colbow et al. | 350/266 |
| 3,712,703 | 1/1973 | Newdigate | 350/289 |
| 3,786,583 | 1/1974 | Revor | 46/58 |
| 3,954,236 | 5/1976 | Brown | 46/53 |
| 3,974,369 | 8/1976 | Chmela et al. | 46/58 |
| 4,108,535 | 8/1978 | Slaughter | 350/99 |

Primary Examiner—John K. Corbin
Assistant Examiner—B. W. de los Reyes
Attorney, Agent, or Firm—John J. Swartz

[57] ABSTRACT

A safety signalling device for a mobile unit such as a motorcycle or the like, to facilitate detection of the motorcycle, comprising a hollow housing having a forward light transparent portion for transmitting the light beam of an oncoming vehicle, an air driven, rotary, signalling member mounted in said housing, the housing including apertures therein for passing ambient air to the rotary member to rotate the rotary light reflecting member as the device and motorcycle move forwardly.

16 Claims, 5 Drawing Figures

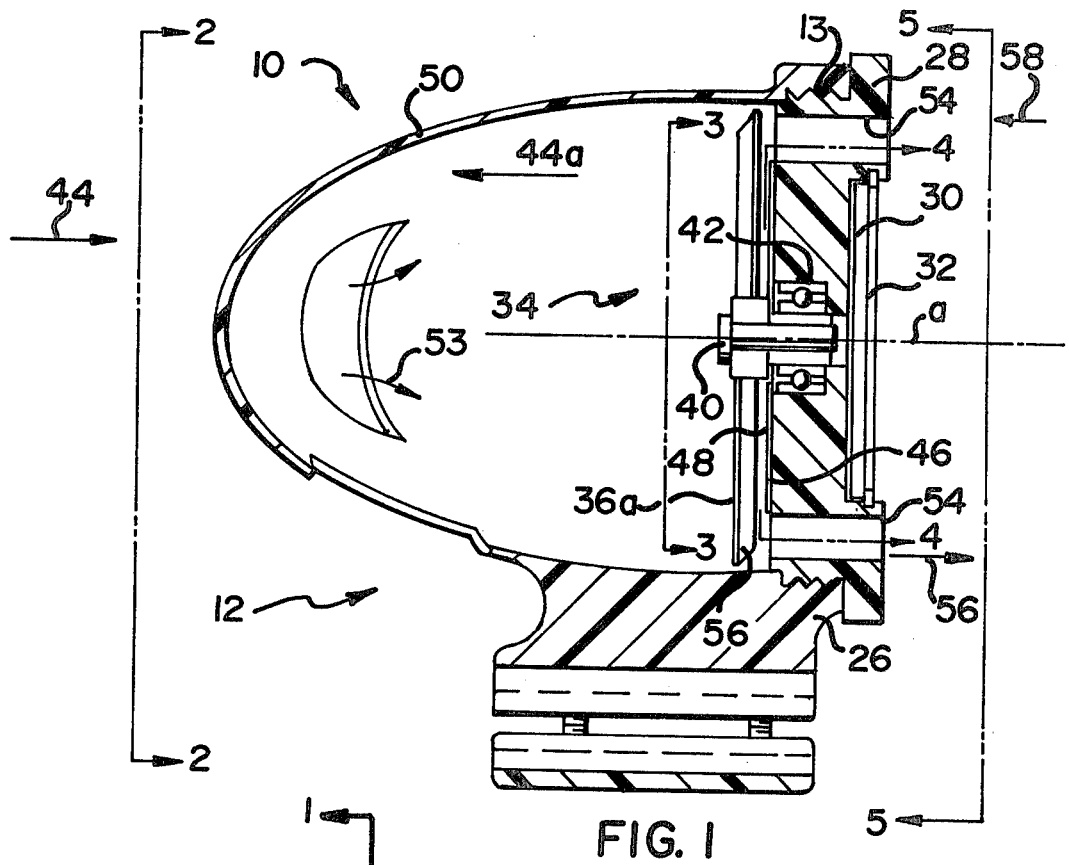
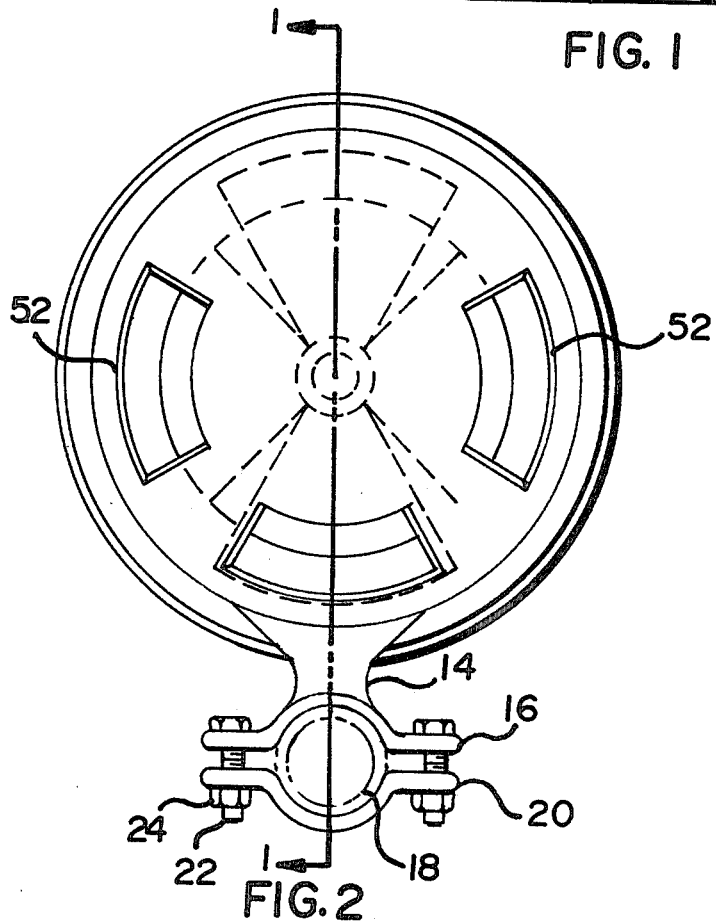
FIG. 1
FIG. 2

REFLECTIVE SIGNALLING DEVICE

BACKGROUND OF THE INVENTION

This invention relates to an air driven rotary reflector device for a mobile unit and the like to facilitate detection of the mobile unit as the unit and device move forwardly.

Bicycles and motorcycles are frequently difficult to detect by other motorists. In the night, the detection is even more difficult. The late detection of bicycle or motor driven cycle may not provide sufficient opportunity to avoid a collision with the bicycle. Conventional light reflectors provided heretofore have not been entirely satisfactory to provide early detection of the two wheel cycles.

Accordingly, it is an object of the present invention to provide apparatus which will facilitate detection of a mobile unit such as a motorcycle or the like.

It is another object of the present invention to provide an air driven, rotary, multi-colored, protected signalling device for a mobile unit, such as a motor driven cycle, or the like, to facilitate early detection of the mobile unit.

Still another object of the present invention is to provide a night-time signalling device for indicating the presence of a moving cycle to a motorist approaching the rear or the front of the cycle.

Yet another object of the present invention is to provide signalling apparatus for signalling the presence of a forwardly moving cycle by means of a rotary, light interrupting member which is protected from the rain or snow.

A further object of the present invention is to provide nocturnal signalling apparatus of the type described having a hollow, light transparent housing portion internally receiving a rotary, signalling member which is driven by ambient air that passes through openings provided in the housing portion.

A still further object of the present invention is to provide signalling apparatus of the type described including a rear view mirror which enables a cycle operator to view the area behind him in combination with a new and novel rotary reflector which reflects light of a vehicle approaching him.

Other objects and advantages of the present invention will become apparent to those of ordinary skill in the art as the description proceeds.

SUMMARY OF THE INVENTION

An apparatus for signalling the presence of a moving cycle or the like comprising a hollow housing having a rear portion and a forward, hollow, light transparent portion, an air driven rotary signal member mounted within the hollow housing for rotation about an axis, the housing including openings therein for passing ambient air to rotatably drive the signal member as the apparatus moves forwardly.

BRIEF DESCRIPTION OF DRAWINGS

The present invention may more readily be understood by reference to the accompanying drawings in which:

FIG. 1 is a sectional side view of apparatus constructed according to the present invention, taken along the line 1—1 of FIG. 2;

FIG. 2 is a front end view taken along line 2—2 of FIG. 1;

DESCRIPTION OF THE PREFERRED EMBODIMENT

Figure 3:
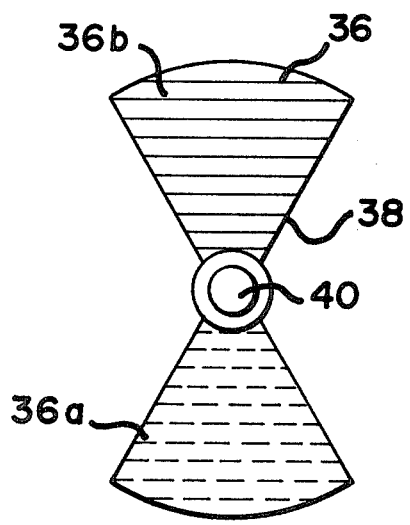
FIG. 3 is a fragmentary front view taken along the line 3—3 of FIG. 1, illustrating the rotary reflector member only.
Figure 4:
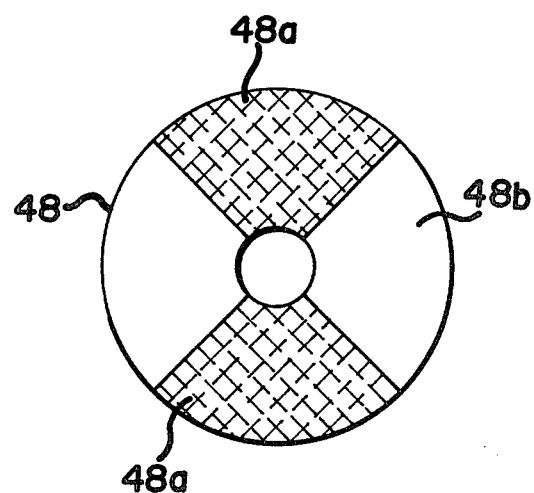
FIG. 4 is a fragmentary front end view, taken along the line 4—4 of FIG. 1, illustrating only the reflective portion of the rear housing member.
Figure 5:
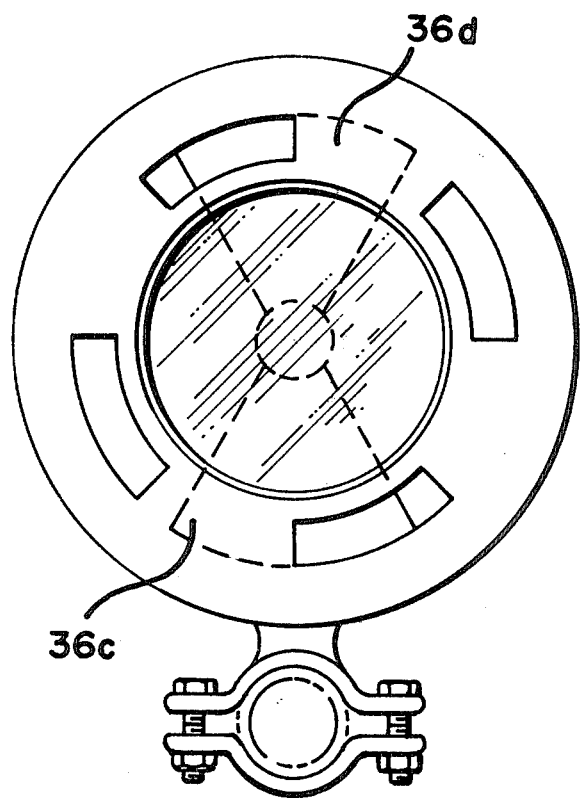
FIG. 5 is a rear elevational view taken along the line 5—5 of FIG. 1.

Apparatus constructed according to the present invention is generally designated 10 and includes a housing, generally designated 12, having an upstanding stem portion 14 including handle-bar mounting clamp flanges 16 overlying the upper side of the handle-bar 18 of a mobile unit such as a motorcycle and the like (not shown). A locking clamp 20 is provided on the underside of the handle-bar 18 and is coupled to the clamp flanges 16 via bolts 22 and nuts 24. The stem 14 mounts an annular, rearwardly disposed, integral, internally threaded ring 26 which threadedly receives a plastic, externally threaded, rear housing portion 28 threadedly received by the ring 26. The rear side of the rear housing portion 28 mounts a centrally located, rear view mirror 30 having a mirror surface 32 which permits a cycle operator, seated on the cycle, to view the area behind the cycle. The housing 10 may suitably comprise plastic.

Rotatably mounted on the forward side of the rear housing portion 28 is an air driven, rotary reflector or signal member, generally designated 34 including a pair of diametrically opposed, radially extending vanes or blades 36 defining openings 38 therebetween. The vanes 36 are mounted on a shaft 40 journalled in bearings 42 provided in the rear housing member 28. The forward surfaces of the vanes 36 are coated with layers 36a, 36b of luminescent or fluorescent material of differing colors such as gray and blue. If desired, each of the surfaces 36a may comprise circumferentially disposed multi-colored sections for example gray and pink on the surface 36a. Likewisely, the surface 36b may comprise circumferentially spaced sections having two different colors, for example, blue and green. The rear surfaces of the vane 36 are likewisely coated with layers 36c, 36d of fluorescent or luminescent material of differing colors. The front vane surfaces 36a and 36b will reflect a portion of a beam of rearwardly directed light, represented by the arrow 44, of an oncoming motorist or the like.

The forward surface 46 of the rear housing member 28 is also coated with a layer 48 of fluorescent or luminescent material having diametrically opposed 90° quadrant sections 48a of one color, such as orange, and diametrically opposed quadrant sections 48b of a contrasting color, such as black. The portion of the light 44 which passes through the openings 38 between the vanes 36 will impinge upon and be reflected by the reflective layers 48a and 48b. The rotary reflector member 34 thus functions to interrupt and reflect portions of the oncoming light beam 44 to "chop" the light beam 44 and provide a readily visible signal to an oncoming motorist. The portions of the light beam passing between the vanes 36 are reflected by the surfaces 48a and 48b to provide flashing signals which alternate in time with the flashing signals of the rotary reflector member 34.

The housing 12 mounts a forward dome shaped, light transparent housing shield portion 50 which provides an enveloping shield that surrounds and is partially disposed forwardly of the light reflecting member 34 to protect the rotary light reflecting and interrupting member 34 from external damage and also protect the member 34 from the elements of rain and snow. The shield 50 may be integral with the stem 52 as illustrated. The light beam 44 will be transmitted through the transparent member shield 50 and will be reflected by the members 36 and 48. A plurality of ambient air inlet openings 52 are provided along the forward end of the transparent housing shield 50 for admitting air, represented by the arrows 53, which impinges upon the vanes 36 forcing the vanes 36 to rotate. Air outlet openings 54 are provided in the rear housing member 28 for permitting the egress of air, represented by the arrows 56, after it has rotated the rotary member 34. The air inlet openings 52 are not equiangularly disposed, but rather are disposed along the sides and bottom of the transparent member shield 50. It should also be noted that the ambient air inlet openings 52 are angularly offset relative to the openings 54 in the rear of the housing. The radial distance of said openings 54 from the rotational axis a is less than the radial length L of the vanes 36. It should also be noted that the outlet openings 54 are radially outwardly of the mirror 32 and are in axial alignment with the radially outer portions 56 of the vanes 36. The radial positioning of the openings permits a light beam 58 of a forwardly moving vehicle to pass through the openings 54 and impinge upon and be reflected by the rear surfaces 36c and 36d of the rotating vanes. The light beam 58 will be periodically interrupted and reflected by the rear surfaces 36c and 36d of the rotating vanes to provide a demonstrable signal to a vehicle approaching the rear of the cycle.

THE OPERATION

In operation, the device 10 is mounted on the handlebar 18 of a cycle via the clamps 16 and 20. As the cycle moves forwardly, air will be admitted through the inlet ports 52 in the direction of the arrows 53 and will impinge upon the vanes 36 causing them to rotate. The air will pass outwardly through the egress openings 54. A light beam 44 of an oncoming motorist will pass through the transparent housing 50. A portion of the light beam 44 will impinge upon the surfaces 36a and 36b and will be reflected in the opposite direction represented by the arrow 44a. A remaining portion of the light beam 44 passing between the vanes 36 will impinge upon the surfaces 48a and 48b and will also be reflected in the opposite direction represented by the arrow 44a. If a vehicle approaches the cycle from the rear, the operator will be able to view the oncoming motorist via the mirror 32. In addition, the light beam 58 will pass through the openings 54 and will be reflected by the rear surfaces 36c and 36d of the vanes 36 which rotate as the cycle moves forwardly.

The rotating member 28 will also be effective to signal the presence of the cycle in the daytime. The multi-colored surfaces 36a, 36b can suitably be arranged in a spiral pattern which will attract the attention of other motorists.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What I claim is:

1. Nocturnal reflector apparatus for signalling the presence of a forwardly moving bicycle or the like, illuminated by the light beam of an approaching motorist or the like, comprising:

a hollow housing having a rear portion and a forward, hollow, light beam transmitting shield portion; and air driven, light interrupting means, mounted within said hollow housing in axial alignment with said forward light beam transmitting portion for rotation about an axis relative to said housing, for interrupting at least a portion of said light beam;

at least one of said rear portion and said interrupting means including light reflecting means for forwardly reflecting a portion of said light beam;

said housing including openings therein for rearwardly passing ambient air from said forward portion toward said rear portion to said interrupting means to rotate said interrupting means as said apparatus moves forwardly.

2. The apparatus set forth in claim 1 wherein said light reflecting means is provided on said rear portion rearwardly of said light interrupting means for reflecting another portion of the light beam on an oncoming vehicle.

3. The apparatus set forth in claim 1 wherein said interrupting means comprises a plurality of radially extending, circumferentially disposed vanes, rotatably mounted on the forward end of said rear housing portion, said vanes including radially inner portions and radially outer portions; a rear view mirror being provided on the rear end of said rear housing portion, generally axially opposite the radially inner portion of said vanes; a portion of said openings comprising air inlet openings provided in the forward light transmitting housing portion radially between said inner and outer portions; and another portion of said openings comprising air outlet openings provided in said rear housing portion radially outwardly of said mirror surface and axially opposite the radially outer portions of said rotating vanes.

4. The apparatus set forth in claim 1 wherein said light beam transmitting portion comprises a light transmitting dome shaped member, a portion of said openings being provided in said dome shaped member in axial alignment with said light interrupting means.

5. The apparatus set forth in claim 4 wherein said forward light beam transmitting portion comprises a light transmitting dome, a portion of said openings comprise air inlet apertures provided in the forward end of said dome radially between said axis and the radially outer ends of said light interrupting means and another portion of said openings comprise outlet openings provided in said rear portion.

6. The apparatus set forth in claim 5 wherein said light interrupting means includes a plurality of radially extending circumferentially disposed vanes having forward and rear surfaces, said light reflecting means being provided on at least said rear surfaces; the radial distance between said outlet openings and said axis being less than the radial length of said vanes so that at least a portion of a forwardly projecting light beam will pass through said outlet openings and be reflected by said light reflecting means.

7. Nocturnal reflector apparatus for signalling the presence of a forwardly moving bicycle or the like, illuminated by the light beam of an approaching motorist or the like, comprising:
- a hollow housing having a rear portion and a forward, hollow, light beam transmitting shield portion;
- air driven, light interrupting means mounted within said hollow housing for rotation about an axis relative to said housing, for interrupting at least a portion of said light beam;
- at least one of said rear portion and said interrupting means including light reflecting means for forwardly reflecting a portion of said light beam;
- said housing including openings therein for rearwardly passing ambient air from said forward portion toward said rear portion to said interrupting means to rotate said interrupting means as said apparatus moves forwardly;
- said light interrupting means including a plurality of radially extending, circumferentially spaced vanes having forward and rear surfaces and defining axial passages therebetween; said light reflecting means being provided on said forward surfaces to reflect a portion of the light beam of an oncoming motorist; said light reflecting means being provided on said rear housing portion to reflect the portion of the light passing through said passages between said vanes.

8. The apparatus set forth in claim 7 including a rear view mirror surface on said rear housing portion for permitting an operator seated on the bicycle to view the area to the rear.

9. The apparatus as set forth in claim 8 wherein a portion of said openings are provided in said light transmitting portion and a portion of said openings are provided radially outwardly of said mirror surface.

10. The apparatus set forth in claim 9 wherein said openings in said rearward portion are radially disposed in such position relative to said vanes that the light beam of a motorist approaching from the rear will impinge upon at least a portion of said rotating vanes.

11. The apparatus set forth in claim 7 wherein said openings include air inlet openings in said forward, light transmitting portion and air outlet openings in said rear housing portion; said outlet openings being radially spaced from said axis at such a location that the light beam of a vehicle approaching from the rear will pass therethrough and impinge on the radially outer portions of said light interrupting means.

12. The apparatus set forth in claim 11 wherein said inlet openings are circumferentially offset from said outlet openings.

13. The apparatus set forth in claim 11 wherein said inlet openings comprise a plurality of openings which are not equiangularly spaced about said axis.

14. Apparatus for signalling the presence of a forwardly moving bicycle or the like, comprising:
- a hollow housing having a rear portion and a forward hollow, light transmitting shield portion for transmitting a beam of light to said rear portion;
- air driven, rotary signalling reflecting means, mounted within said hollow housing in axial alignment with said forward light transmitting portion for rotation about an axis relative to said housing, for forwardly reflecting a portion of said beam of light to attract the attention of oncoming drivers;
- said housing including openings therein for rearwardly passing ambient air to said signalling means to rotate said signalling means as said apparatus moves forwardly.

15. The apparatus set forth in claim 14 wherein a portion of said openings are provided in said light transmitting portion in axial alignment with said light interrupting means.

16. Apparatus for signalling the presence of a bicycle or the like comprising:
- a hollow housing having a rear portion and a forward, light beam transmitting shield portion which will rearwardly transmit a light beam to said rear portion;
- air driven, light interrupting means, mounted within said hollow housing in axial alignment with said forward light beam transmitting portion for rotation relative to said housing about an axis, for interrupting a portion of said beam of light;
- said interrupting means including a plurality of radially extending circumferentially disposed vanes and light reflecting means on said vanes for forwardly reflecting a portion of said light beam;
- said housing including openings therein for rearwardly passing ambient air to said interrupting means to rotate said interrupting means; and
- additional light reflecting means on said rear housing portion for forwardly reflecting another portion of said light beam passing between said vanes.

* * * * *